United States Patent
Hökelek

(10) Patent No.: US 10,094,358 B2
(45) Date of Patent: Oct. 9, 2018

(54) WIND TURBINE BLADE WITH DOUBLE AIRFOIL PROFILE

(71) Applicant: Winnova Energy LLC, Houston, TX (US)

(72) Inventor: Yücel Hökelek, Ankara (TR)

(73) Assignee: Winnova Energy LLC, Houston, TX (US)

( * ) Notice: Subject to any disclaimer, the term of this patent is extended or adjusted under 35 U.S.C. 154(b) by 268 days.

(21) Appl. No.: 14/804,742

(22) Filed: Jul. 21, 2015

(65) Prior Publication Data
US 2017/0022967 A1  Jan. 26, 2017

(51) Int. Cl.
*F03D 1/06* (2006.01)

(52) U.S. Cl.
CPC ......... *F03D 1/0675* (2013.01); *F03D 1/0633* (2013.01); *F05B 2240/231* (2013.01); *F05B 2240/30* (2013.01); *Y02E 10/721* (2013.01)

(58) Field of Classification Search
CPC .... F03D 1/0633; F03D 1/0641; F03D 1/0675; F03D 1/0683
See application file for complete search history.

(56) References Cited

U.S. PATENT DOCUMENTS

| | | | |
|---|---|---|---|
| 5,161,952 A | 11/1992 | Eggers, Jr. | |
| 7,387,491 B2 | 6/2008 | Saddoughi et al. | |
| 7,435,057 B2 | 10/2008 | Parera | |
| 8,011,886 B2 * | 9/2011 | Subramanian | F03D 1/06 416/23 |
| 8,011,887 B2 * | 9/2011 | Fisher | F03D 1/0641 416/23 |
| 8,177,517 B2 * | 5/2012 | Grabau | F03D 1/0641 416/222 |
| 8,182,231 B2 * | 5/2012 | Corten | F03D 1/0641 416/223 R |
| 8,246,311 B2 | 8/2012 | Pesetsky | |
| 8,376,703 B2 * | 2/2013 | Carroll | F03D 1/0675 416/23 |
| 8,430,633 B2 * | 4/2013 | Carroll | F03D 1/0633 416/23 |
| 8,647,063 B2 * | 2/2014 | Koike | F03D 1/0675 416/223 R |
| 8,747,067 B2 * | 6/2014 | Barban | F03D 1/0633 415/4.3 |
| 8,747,070 B2 | 6/2014 | Blonder | |

(Continued)

FOREIGN PATENT DOCUMENTS

| | | | | |
|---|---|---|---|---|
| CA | 2425447 A1 * | 10/2004 | | F03D 1/0633 |
| DE | 3723101 A1 * | 2/1989 | | B64C 11/16 |

(Continued)

*Primary Examiner* — Richard Edgar
*Assistant Examiner* — John S Hunter
(74) *Attorney, Agent, or Firm* — Meyertons, Hood, Kivlin, Kowert & Goetzel, P.C.; Gareth M. Sampson

(57) ABSTRACT

Double blade airfoils and related systems are disclosed. The double blade design may efficiently use a minimal amount of material yet achieve exceptional aerodynamic efficiencies well above the previously understood theoretical maximum. The disclosed designs may operate at lower wind speeds than those known in the art. Furthermore, the balance of forces generated by the disclosed designs may also reduce the stress felt by the airfoils and rotor, enhancing the longevity of the system.

10 Claims, 3 Drawing Sheets

(56) References Cited

U.S. PATENT DOCUMENTS

| | | | |
|---|---|---|---|
| 8,777,580 B2* | 7/2014 | Eisenberg | F03D 1/0633 416/239 |
| 8,834,127 B2* | 9/2014 | Giguere | F03D 1/0633 416/228 |
| 8,834,130 B2* | 9/2014 | Fuglsang | F03D 1/0675 416/203 |
| 8,985,947 B2* | 3/2015 | Obrecht | F03D 1/0683 416/244 R |
| 9,032,622 B2* | 5/2015 | Hancock | F03D 1/0675 29/525.01 |
| 9,057,359 B2* | 6/2015 | Fuglsang | F03D 1/0641 |
| 9,068,559 B2* | 6/2015 | Hancock | B29C 70/30 |
| 9,086,053 B2* | 7/2015 | Herrig | F03D 1/0633 |
| 9,151,270 B2* | 10/2015 | Eisenberg | F03D 1/0641 |
| 9,175,666 B2* | 11/2015 | Eisenberg | F03D 1/0633 |
| 9,228,564 B2* | 1/2016 | Wirz | F03D 1/0675 |
| 9,366,224 B2* | 6/2016 | Braaten | F03D 1/0633 |
| 2010/0209258 A1* | 8/2010 | Fuglsang | F03D 1/0641 416/90 R |
| 2011/0116923 A1* | 5/2011 | Larsen | F03B 3/121 416/1 |
| 2011/0142636 A1* | 6/2011 | Curtin | F03D 1/0658 416/62 |
| 2011/0142676 A1* | 6/2011 | Mohammed | F03D 1/0633 416/241 R |
| 2014/0271216 A1* | 9/2014 | Syrovy | F03B 17/061 416/224 |
| 2014/0294592 A1* | 10/2014 | Drack | F03D 1/0633 416/228 |
| 2015/0050159 A1 | 2/2015 | Caldeira et al. | |
| 2015/0078913 A1* | 3/2015 | Enevoldsen | F03D 1/0608 416/241 R |
| 2015/0275856 A1* | 10/2015 | Tahar | F03D 1/0658 416/131 |
| 2015/0316025 A1* | 11/2015 | Enevoldsen | F03D 1/0675 416/237 |
| 2016/0265508 A1* | 9/2016 | Betran Palomas | F03D 7/022 |
| 2017/0138340 A1* | 5/2017 | Asheim | F03D 1/0675 |
| 2017/0248115 A1* | 8/2017 | Harrison | F03D 1/0633 |

FOREIGN PATENT DOCUMENTS

| | | | | |
|---|---|---|---|---|
| DE | 102007021213 A1 * | 11/2008 | | F03B 3/121 |
| DE | 102008026474 A1 * | 12/2009 | | F03D 1/0675 |
| DE | 202012005356 U1 | 7/2012 | | F03D 1/0641 |
| WO | WO 9831934 A1 * | 7/1998 | | F03D 1/02 |
| WO | WO 2009098340 A1 * | 8/2009 | | F03D 1/0641 |
| WO | WO 2010100237 A2 * | 9/2010 | | F03D 1/0641 |
| WO | 2012007934 A1 | 1/2012 | | |
| WO | WO 2012019611 A2 * | 2/2012 | | F03D 1/0675 |
| WO | WO 2013060722 A1 * | 5/2013 | | F03D 1/0633 |
| WO | WO 2013075718 A1 * | 5/2013 | | F03D 1/0641 |
| WO | WO 2016037261 A1 * | 3/2016 | | F03D 1/0633 |

* cited by examiner

WIND TURBINE BLADE WITH DOUBLE AIRFOIL PROFILE

BACKGROUND

Field of the Invention

The invention relates generally to the field of wind turbines, and more specifically to improved blade designs that increase power, efficiency, and reliability. The blades may be utilized in a variety of applications, including wind turbines and turbine engines.

Description of Related Art

Wind turbines are an important component of renewable sources of energy generation. Wind turbine technology has been applied to large-scale power generation applications. Of the many challenges that exist in harnessing wind energy, one is maximizing wind turbine performance while ensuring reliability and broad applicability. Non-limiting examples of improved wind turbine performance parameters, which lead to minimized cost of energy, include maximized aerodynamic efficiency, maximized energy output, minimized wind turbine system loads, minimized noise, and combinations thereof.

The blade profiles are the most important factor in determining a wind turbine's performance and efficiency. The location which a turbine will be installed is also significant. In addition to wind potential, the wind structure is crucial too. Some factors, such as roughness of the surface, field, altitude, air pressure, temperature, density of the air, gust of wind, the direction and speed of the wind, are of great importance for turbines to work properly.

In practical designs, inefficiencies in the design and frictional losses will reduce the power available from the wind still further. Converting this wind power into electrical power also incurs losses of up to 10% in the drive train and the generator and another 10% in the inverter and cabling. Furthermore, when the wind speed exceeds the rated wind speed, control systems limit the energy conversion in order to protect the electric generator so that ultimately, the wind turbine will convert only about 30% to 35% of the available wind energy into electrical energy.

Such a conversion efficiency is in line with aerodynamic theory. German aerodynamicist Albert Betz showed that a maximum of only 59.3% of the theoretical power can be extracted from the wind, no matter how good the wind turbine is, otherwise the wind would stop when it hits the blades. He demonstrated mathematically that the optimum extraction occurs when the rotor reduces the wind speed by one third. However, the disclosed embodiments represent a new technique for exceeding this theoretical limit, and thus represent a major step forward for the field.

One objective in wind turbine design is to maximize aerodynamic efficiency, or power extracted from the wind. The number of blades in the turbine rotor and their rotational speed must be optimized to extract the maximum energy from the available wind. While using rotors with multiple blades should capture more wind energy, there is a practical limit to the number of blades which can be used because each blade of a spinning rotor leaves turbulence in its wake, which reduces the amount of energy the following blade can extract from the wind. This same turbulence effect also limits the possible rotor speeds because a high speed rotor does not provide enough time for the air flow to settle after the passage of a blade before the next blade comes along. There is also a lower limit to both the number of blades and the rotor speed. With too few rotor blades, or a slow turning rotor, most of the wind will pass undisturbed through the gap between the blades reducing the potential for capturing the wind energy. The fewer the number of blades, the faster the wind turbine rotor needs to turn to extract maximum power from the wind. This can be a disadvantage as it limits the areas in which a turbine can be placed to those with relatively high average wind speed.

It is helpful to view a blade profile as an airfoil cross section from root to tip. The forces generated may be expressed as the sum of two tangential forces. The force which drives the wind turbine, lift force, is generated when wind flows over the airfoil. Lift force is perpendicular to apparent velocity of the wind. Generally lift force increases with angle of attack, that is, the relative orientation of the airfoil surface to the motion of the wind. The second force component, drag force, also increases with angle of attack. While the lift force supports blade rotation, the drag force opposes it. Thus, wind turbine performance is maximized when the lift to drag ratio is maximized. The angle at which this occurs is called the optimum angle of attack. Airfoil cross sections are aligned in a way to operate at this optimum angle of attack.

Apparent wind velocity is the wind experienced by an observer in motion, in this case the blade profile surface, and is the relative velocity of the wind in relation to the observer. Apparent wind velocity is the vector sum of the true wind and the headwind an object would experience in still air. Even though wind velocity is uniform along the length of the blade, blade velocity increases linearly as we move towards the tip. Thus, angle and magnitude of the apparent wind velocity varies along the length of the blade. Apparent velocity becomes more aligned with the chord direction towards the tip of the blade. Because of this variation in apparent velocity, it may be preferable to twist the blade profile such that every portion of the airfoil cross section operates at its optimum angle of attack while the blade is rotating about the rotor in the wind.

With the increasing popularity of wind turbines, there is a need for improved blade profile designs that increased the efficiency and durability of the overall wind turbine. It would also be advantageous if the profile was operable at lower minimum velocities, as that would expand the potential for wind installations to areas that where winds were previously considered too slow to efficiently harness.

There are a wide variety of wind turbine blade designs. In addition to specific designs by individuals or corporations, there are standardized blade profiles defined by NACA and Gottingen, for example the NACA 0015 and Gottingen 622 airfoils. There are numerous variations on single profile designs, however the art does not teach two blade profiles physically coupled together. For example, WIPO Patent Application WO/2012/007934, filed Jul. 7, 2011, "relates to a wind turbine having inner and outer blades for directing wind flow towards each other." The inner and outer blades are separate from each other and rotate in opposite directions.

U.S. Pat. No. 5,161,952, entitled "Dual-plane blade construction for horizontal axis wind turbine rotors," to Eggers, Jr., describes a wind turbine with blades that are joined together at both the rotor and tip.

U.S. Patent Application Pub. No. 2015/0050159 to Caldeira, et al., describes turbine engines with a blade design in which the "turbine blade further includes a shell disposed around the core element, and the volume between the core element and the shell forms a void."

WIPO Patent Application WO/2012/007934, by Mordechai Cohen, states that "the present invention relates to a wind turbine having inner and outer blades for directing wind flow towards each other." In other words, Cohen describes an arrangement where two independent sets of blades are set in two shafts and are allowed to rotate freely from each other.

U.S. Pat. No. 7,387,491 to Saddoughi, et al., describes "active flow modification in wind turbines for reducing loads, reducing aerodynamic losses, improving energy capture, reducing noise, and combinations thereof."

U.S. Pat. No. 8,246,311, entitled "Wind turbine rotor blade with variably actuatable porous window" and filed Dec. 7, 2010 by David Samuel Pesetsky, describes a porous window that may be slid along the chord of the blade.

U.S. Pat. No. 7,435,057, entitled "Blade for wind turbine" and filed Jul. 13, 2005 by Jorge Panera, discloses a hollow blade with an active fan mounted inside the blade to actively create a high velocity air current.

U.S. Pat. No. 8,747,070, entitled "Spinning horizontal axis wind turbine," by Greg E. Blonder, discloses "A spinning horizontal axis wind turbine is disclosed. The blades of the wind turbine are configured to allow the blades to simultaneously rotate in a vertical axis and a horizontal axis when acted upon by an external force such as a wind current. The tip of each blade travels along a helical 'figure 8' pattern as the blade rotates through a complete cycle, moving from nearly vertical to nearly horizontal in a complete cycle."

Despite the improvements shown in the above described designs, there is still a need for improved wind turbine profiles and profile designs that approach or exceed the Betz theoretical efficiency limit.

SUMMARY

Embodiments of systems and methods for improving the aerodynamic efficiency and reliability of airfoils are disclosed herein. In one embodiment, the new blade profiles generates lifting force far greater than that generated by standard profiles, and, unlike standard profiles, the corresponding friction force is in the direction of the movement. This increases the torque of the blade. An additional benefit of the design is that, in addition to lifting force, a counter force is generated in the opposite direction of the drag force, thereby partially counteracting it, which boosts efficiency and reduces strain on the rotor and blades.

Several aspects of embodiments disclosed herein reside in a wind turbine including a wind turbine blade and the wind turbine blade assembly. In these aspects, a wind turbine blade is configured to rotate about an axis upon impact of a wind flow. In these aspects a paired set of blade profiles are utilized, wherein the wind hitting each profile is split between the two surfaces of the respective profiles. These profiles differ from each other and generate different force vectors which, when summed together, counteract undesirable drag forces and generate additional force in the direction of lift.

In one aspect of embodiments disclosed herein, a high pressure zone is created on a surface of one blade profile such that the high pressure generates a force substantially in the direction of rotation of the blade. Another aspect of embodiments disclosed herein is a profile that contains a concave and convex portion configured to generate the aforementioned high pressure zone with its advantageous force orientation.

In another aspect of embodiments disclosed herein, a high pressure zone is created on a surface of one blade profile such that the high pressure generates a force substantially counter to the drag force of the overall blade assembly. Another aspect of embodiments disclosed herein is a profile that contains a concave and convex portion configured to generate the aforementioned high pressure zone with its advantageous counter-force orientation.

In another aspect of embodiments disclosed herein, the two aforementioned aspects are paired together to synergistically boost the aerodynamic efficiency of the airfoil.

In another aspect of embodiments disclosed herein, a profile contains a concave and convex portion configured to generate a high pressure zone substantially in the direction of rotation of the blade.

Another aspect of embodiments disclosed herein is a variable twist angle along the profile configured to balance the pressure experienced by the by blade such that the pressures generated at the leading and trailing sections of the profile balance the pressure in the middle of the profile.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
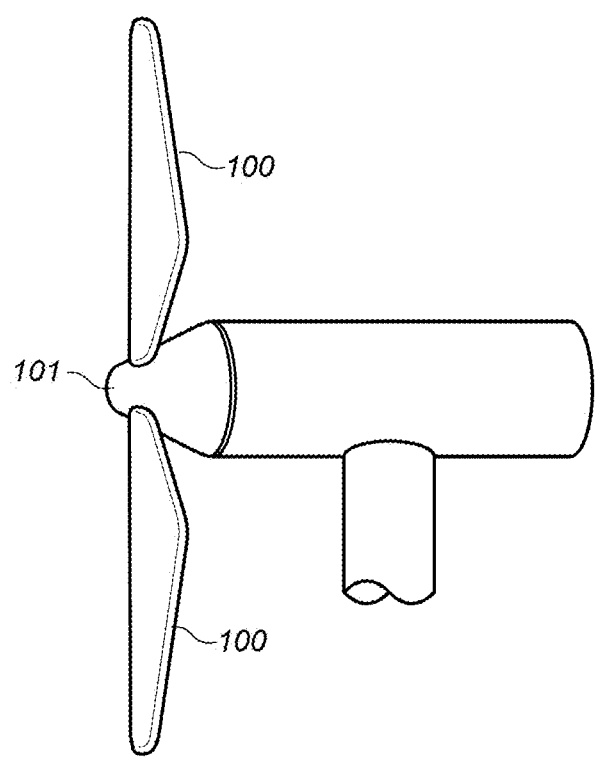
FIG. 1 illustrates the general components found in a wind turbine.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

In the context of this patent, the term "coupled" means either a direct connection or an indirect connection (e.g., one or more intervening connections) between one or more objects or components. The phrase "directly connected"

means a direct connection between objects or components such that the objects or components are connected directly to each other so that the objects or components operate in a "point of use" manner.

The lift coefficient ($C_L$) is a dimensionless coefficient that relates the lift generated by a lifting body to the fluid density around the body, the fluid velocity and an associated reference area. A lifting body is a foil or a complete foil-bearing body such as a fixed-wing aircraft. $C_L$ is a function of the angle of the body to the flow, its Reynold number and its Mach number. It is well known in the art that regular blade profiles have a $C_L$ of 1.4 to 1.6. By comparison, the $C_L$ of the disclosed double blade profile is approximately 3.2. In other words, the torque generated by the double blade profile is double that of existing profiles. Further, the efficiency of the disclosed double blade profile is approximately 79%, which exceeds the Betz limit of 59.3%.

Compared with existing profiles, the disclosed double blade profile produces twice the power for a given rotor diameter, operates efficiently with lower minimum wind velocity, and extended mechanical life due to reduced strain on the rotor.

The particular arrangement of rising and falling pressures zones, which are created on the profile surfaces based on their unique shapes, bring about the high efficiency and power of the overall design. The compressive force between the zones of high and low pressure is always on the attack side of the profile, which is a characteristic that has not been observed in any design known to the art.

On the existing blades, when a vertical lifting force develops, a dragging force is also observed. In the disclosed embodiments, the lift force and drag force are on the attack sides of the wing design. This orientation naturally increases the torque that the blades exert.

The calculated net momentum ratio of the disclosed embodiments is around 0.79, which, as noted above, handedly exceeds the Betz theoretical upper limit for a profile design. Another interesting aspect of the disclosed embodiments is that, despite using two blades in place of one, the overall material quantity and fabrication cost are not substantially increased when compared to a standard blade design. This is a major practical advantage, as the disclosed embodiments are cost competitive with existing designs even before accounting for the greatly enhanced efficiency and other operating characteristics.

Figure 2:
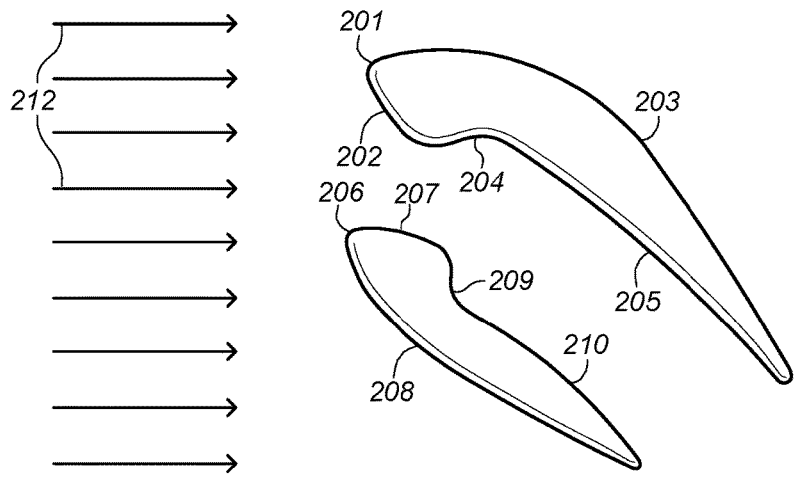
FIG. 2 illustrates a cross section of the profile surfaces of an embodiment.

As shown in FIG. 1, a wind turbine consists of one or more airfoils 100 attached to a rotor 101. The airfoils 100 rotate around the rotor 101. When wind passes over the airfoils, a lifting force is created in the direction of rotation for the overall wind turbine assembly. A drag force is also generated in the direction of the wind. The portion of the profile that first feels the oncoming wind is the leading edge while the opposite end is the trailing edge FIG. 2 shows a cross section of one of the embodiments. As can be seen from the cross section, two profiles with different shapes are paired together in a double blade airfoil that synergistically combines the forces developed by each profile. The cross section is viewed from the tip of the profile looking towards the rotor, i.e., from the tip of the blades looking towards the middle of the wind turbine. The arrows around 212 indicate the direction of the wind hitting the profile.

For ease of explication, various surfaces of the two profiles are denoted 201, 202, 203, 204, 205, 206, 207, 208, 209, and 210. Starting with the top profile (note that the concept of top and bottom are purely for illustrative clarity—as the blades of the turbine rotate the absolute orientation of the profiles changes depending on view point), wind 212 is split in to two at surface 201 and flows along surfaces 203 and 202. In the same way, on the bottom profile wind 212 splits along surface 206 and flows along surfaces 207 and 208. According to the hump shape of these four surfaces, the flow speed increases at various rates and pressure decreases at various rates. Air expands along surfaces 204 to 205 and 209 to 210 between two profiles. These surfaces create volumetric expansion in the middle of the two profiles. The air speed of the wind decreases in this expanded region, with a corresponding increase in pressure. This high pressure creates a force towards the low pressure areas elsewhere along the surfaces of the profiles. This pressure force component is in the direction of rotation of the blade and opposite the direction of wind drag.

Figure 3:
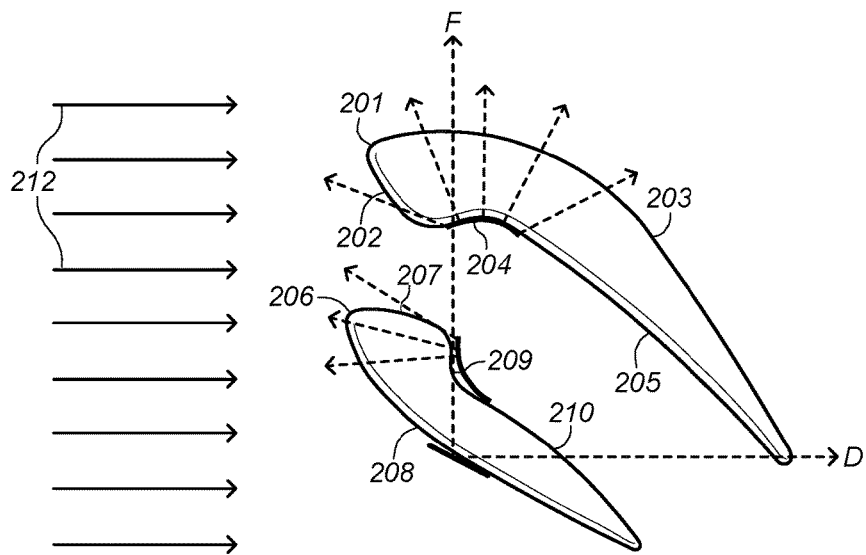
FIG. 3 illustrates, according to one embodiment, the forces generated by the varying pressures created as air flows along the surface of the profiles.

FIG. 3 shows representative force vectors generated by the pressures described with respect to FIG. 2. As shown in FIG. 3, the vector "F" is the lifting pressure force and the vector "D" is the corresponding friction force, which is in the direction of the wind flow. As can be seen, the velocity and direction of the pressure force moving the blade is different from standard blades designs. The pressure differentials generated on the profile surfaces are much larger than in standard designs, and the corresponding pressure force and velocity are also increased relative to standard designs. Furthermore, the generated pressure forces are aligned and positioned to positively impact the lifting and pushing forces experienced by the blades. The net result is an increase in performance, torque, and force while improving reliability via reduced mechanical strain on the blades and rotor.

Figure 4:
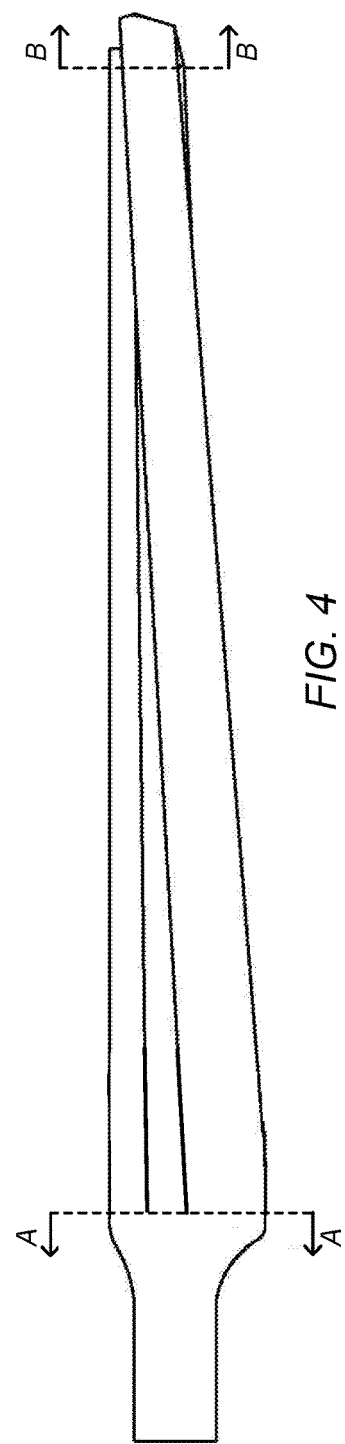
FIG. 4 illustrates a side view of one embodiment of a blade.

As shown in FIG. 4, as one moves along the chord of the blade, the exact shape of the profile varies the optimized angle of attack at each point along the blade and the previously described aerodynamic effects. As noted elsewhere, this is due to the fact that the blades are rotating in a circle around an axis and that the outer tip of the blades move more rapidly through the air than the inner portion. At a conceptual level, the variations in profile shape can be thought of as twisting the profile along the blade's major axis, though the exact angle and variation in shape is calculated for each point along the blade, accounting for the speed of the wind as well as the rotating blade. This twisting of the profile helps ensure that the pressure formed on the front and back surfaces of the blade profile balances the pressure occurring in the middle of the profile. As a result of this, the breaking risk of the blade decreases.

Figure 4B:
FIG. 4B depicts cross sections of the profile of the blade near the tip end of the blade.
Figure 4A:
FIG. 4A depicts cross sections of the profile of the blade near the rotor end of the blade.

Additionally, FIGS. 4A and 4B depict the cross section of each end of the profile. FIG. 4A depicts cross sections of the profile 401 and 402 near the rotor end of the blade (along cross section "A-A" shown in FIG. 4). FIG. 4B depicts cross sections of profile 403 and 404 near the tip end of the blade (along cross section "B-B" shown in FIG. 4). In some embodiments, the profile tapers as one moves from the rotor, illustrated by cross sections 401 and 402 to the tip, illustrated by cross sections 403 and 404. This change helps optimize the distribution of pressure along, preventing, e.g., an excessively large torque at the tip of the blade from shattering the blade. Additionally, as noted above, in some embodiments, as shown in FIGS. 4, 4A, 4B, the profiles twists around the major axis of the blades. In certain embodiments, this twisting is combined with the tapered shape to further optimize the forces on the blades.

As used herein, the terms "or" is intended to cover a non-exclusive inclusion. That is, "or" includes both meanings of both "or" and "and/or."

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, "airfoil" means a body designed to provide a desired aerodynamic force when in motion relative to the surrounding fluid. Fluids may be gaseous or liquid.

As used herein, "blade" refers to an airfoil.

As used herein, "turbine" refers to a rotary mechanical device that extracts energy from a fluid flow and converts it into useful work. Fluids may be gaseous or liquid.

As used herein, "profile" refers to the contour or form of a body, especially in a cross section.

As used herein, "rotor" refers to the rotating assembly in a turbine, especially a wind turbine.

The flowchart and block diagrams in the drawings illustrate the architecture, functionality, and operation of possible implementations of systems, methods and program products, according to various embodiments of the present invention.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a sub combination or variation of a sub combination.

Similarly, the separation of various system components in the implementations described above should not be understood as requiring such separation in all implementations, and it should be understood that the described program components and systems can generally be integrated together in a single software product or packaged into multiple software products.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

Furthermore, the recitation of any element is expressly intended not to invoke 35 U.S.C. § 112, paragraph (f) interpretation for that element unless the language "means for" or "step for" is specifically recited.

What is claimed is:

1. A wind turbine comprising:
an airfoil connected to a rotor on the wind turbine, the airfoil being configured to rotate about an axis upon an impact of a wind flow on the airfoil, the airfoil comprising:
   a lower blade and an upper blade, the lower blade and the upper blade being separated by a gap extending along a radial direction of the airfoil from a portion of the airfoil connected to the rotor to a tip of the airfoil;
   wherein the lower blade and the upper blade have profiles with different shapes, an inner surface of the lower blade comprising a profile having both a convex-shaped portion and a concave-shaped portion along a chord direction of the lower blade, and an inner surface of the upper blade comprising a profile having both a convex portion-shaped and a concave-shaped portion along a chord direction of the upper blade; and
   wherein the lower blade profile tapers from a larger cross section at the portion of the airfoil connected to the rotor to a smaller cross section at the tip of the airfoil, and wherein the upper blade profile tapers from a larger cross section at the portion of the airfoil connected to the rotor to a smaller cross section at the tip of the airfoil.

2. The wind turbine of claim 1, wherein a size of the gap varies along a longitudinal axis of the airfoil.

3. The wind turbine of claim 1, wherein each of the lower blade profile and the upper blade profile contains at least 5 aerodynamically distinct surfaces.

4. The wind turbine of claim 1, wherein the inner surfaces of the lower blade and the upper blade comprise complementary inner surfaces configured to expand air along the inner surfaces between the lower blade and the upper blade.

5. The wind turbine of claim 4, wherein the complementary inner surfaces are configured to increase pressure and decrease air speed in the space between the lower blade and the upper blade.

6. A wind turbine comprising:
an airfoil connected to a rotor on the wind turbine, the airfoil being configured to rotate about an axis upon an impact of a wind flow on the airfoil, the airfoil comprising:
   a lower blade and an upper blade, the lower blade and the upper blade having inner surfaces separated by a gap extending along a radial direction of the airfoil from a portion of the airfoil connected to the rotor to a tip of the airfoil;
   wherein a profile of the inner surface of the lower blade changes from a convex-shaped portion to a concave-shaped portion along a chord of the lower blade, and wherein a profile of the inner surface of the upper blade changes from a convex-shaped portion to a concave-shaped portion along a chord of the upper blade; and
   wherein the profile of the lower blade tapers from a larger cross section at the portion of the airfoil connected to the rotor to a smaller cross section at the tip of the airfoil, wherein the profile of the upper blade tapers from a larger cross section at the portion of the airfoil connected to the rotor to a smaller cross section at the tip of the airfoil.

7. The wind turbine of claim 6, wherein a size of the gap changes along a longitudinal axis of the airfoil.

8. The wind turbine of claim 6, wherein each of the lower blade profile and the upper blade profile contains at least 5 aerodynamically distinct surfaces.

9. The wind turbine of claim 6, wherein the lower blade and the upper blade comprise complementary inner surfaces configured to expand air along the inner surfaces between the lower blade and the upper blade.

10. The wind turbine of claim 9, wherein the complementary inner surfaces are configured to increase pressure and decrease air speed in the space between the lower blade and the upper blade.

\* \* \* \* \*